United States Patent [19]

Reisinger et al.

[11] 4,031,316
[45] June 21, 1977

[54] APPARATUS FOR THE TIME DIVISION MULTIPLEX TRANSMISSION OF BINARY SIGNALS

[75] Inventors: Konrad Reisinger, Zorneding; Ludwig Hölzl, Sauerlach, both of Germany

[73] Assignee: Siemens Aktiengesellschaft, Munich, Germany

[22] Filed: Mar. 19, 1976

[21] Appl. No.: 668,521

[30] Foreign Application Priority Data

Mar. 20, 1975 Germany .......................... 2512271

[52] U.S. Cl. .............................................. 178/50
[51] Int. Cl.² ........................................ H04L 5/00
[58] Field of Search .......... 178/50, 53.1 R, 53.1 A, 178/69.5 R, 69.5 DC; 179/15 BS, 15 BA, 15 AF, 15 AL Primary Examiner—Thomas A. Robinson
Attorney, Agent, or Firm—Gerald L. Lett

[57] ABSTRACT

Apparatus is described for transmitting on a time division multiplex (t.d.m.) basis binary signals which are emitted by a plurality of data sources, each of which are connected to a multiplexer. During a cycle of operation the multiplexer establishes a conductive connection between each of its inputs, each of which is connected to a data source, and the output of the multiplexer for transmission to a receiver over a transmission link. Signals emitted from the multiplexer output are coupled to an in-phasing device which phases the individual bits into a t.d.m. signal.

3 Claims, 7 Drawing Figures

APPARATUS FOR THE TIME DIVISION MULTIPLEX TRANSMISSION OF BINARY SIGNALS

BACKGROUND OF THE INVENTION

This invention relates to apparatus for the time division multiplex (t.d.m.) transmission of binary signals, emitted from a plurality of data sources.

In a known t.d.m. transmission system, the individual data sources are each connected by a channel unit to inputs of a multiplexer which during the length of a cycle which is approximately equal to the duration of one bit, consecutively establishes conductive connections between the inputs and the output of the multiplexer. These channel units customarily contain buffer stores which temporarily store the individual bits of the signals emitted from the data sources in order that the individual bits can be switched through in phase from the inputs of the multiplexer to its output. Thus, the output of the multiplexer emits a t.d.m. signal which, within a given t.d.m. frame, successively signals each of the binary signals emitted from the data sources. Since as many channel units as data sources must be provided, and each of these channel units must possess buffer stores and circuit devices, the practicing of this known technique necessitates considerable expense in particular when a large number of data sources must be provided.

An object of the invention is to provide apparatus for t.d.m. transmission which can be realized with lower expense than the described known technique.

SUMMARY OF THE INVENTION

In accordance with the invention the foregoing and other objects are achieved in apparatus which is characterized by comparatively low expense as the in-phasing of the individual bits is effected, not in the region of the conventional channel units, but in a central in-phasing device which facilitates a more economical store organization.

The signal emitted from the output of the multiplexer is composed of components which signal all the binary signals during a cycle duration. In order to take into account time distortions of the individual bits, it is expedient to sample the components of the signal emitted from the multiplexer approximately in the center and to obtain corresponding sample values from the sum of which the t.d.m. signal is formed. The shorter the cycle time is in relation to the duration of the individual bits, the more frequently are the inputs of the multiplexer conductively connected to its output, and the more accurate is the sampling in the center of the individual components.

It is advantageous to determine the centers of the individual bits with the aid of counters, which, at a given count, trigger the sampling of the individual bits and with the aid of which a release signal is produced which facilitates the sampling of the individual bits after the occurrence of a start element during a given length of time. This duration can be varied by the input of a binary word into the counter, and can for example be set up in such a manner that dialled pulses can also be transmitted in optimum fashion.

If partially disturbed start elements must be contended with it is advantageous to sample the individual start elements several times with the aid of a start element safeguard device, and from these sample values, by means of a majority decision, to derive a start element safeguard signal which stops the sampling of the individual bits in the event of a disturbed start element.

BRIEF DESCRIPTION OF THE DRAWINGS

In the following exemplary and preferred embodiments the construction according to the invention will be described making reference to the Figures, where identical components represented in more than one Figure are provided with identical references. The Figures are briefly described as follows.

DETAILED DESCRIPTION OF THE DRAWINGS

Figure 1:
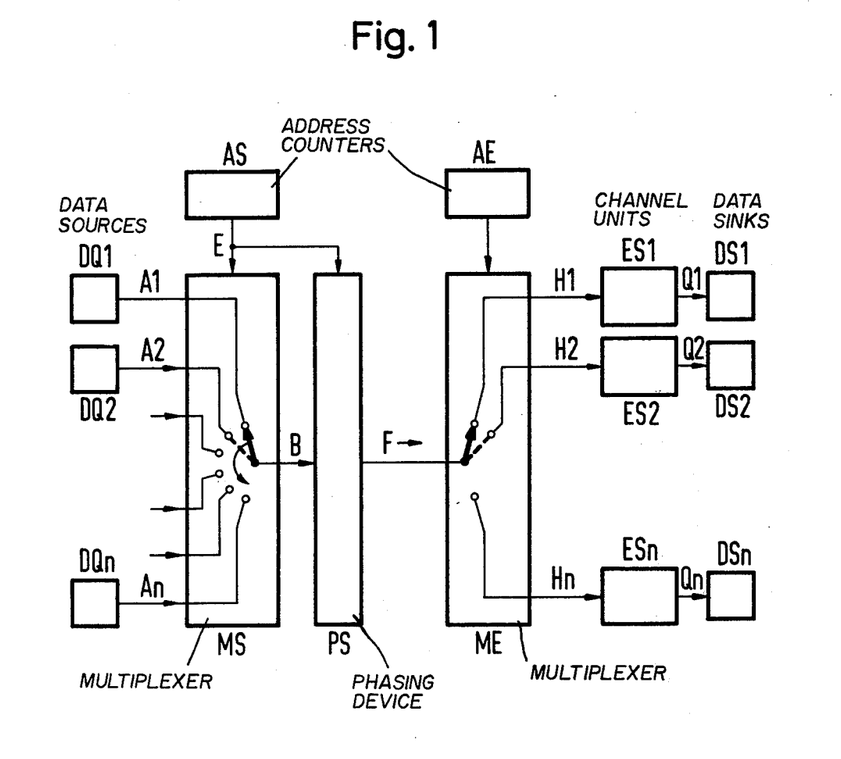
FIG. 1 is a block circuit diagram of a t.d.m. data transmission system.

FIG. 1 shows a t.d.m. data transmission system. Data sources DQ1, DQ2 . . . DQn supply the data which is to be transmitted to a transmitting-end multiplexer MS which is controlled by a transmitting-end address counter AS. This address counter AS constantly emits addresses one, two . . . n, one, two . . . n, corresponding to the signals A1, A2 . . . An. If, for example, the address one is called up, the signal A1 is switched through via the input of the multiplexer MS to its output. Thus, the signal B is composed of components of the signals A1 to An. The transmitting-end in-phasing device PS serves to bring the individual bits of the signals A1 to An into phase. In this way the signal F is formed which is transmitted across a transmission link.

At the receiving end are arranged a receiving-end multiplexer ME, a receiving-end address counter AE and data sinks DS1, DS2 . . . DSn.

Figure 2:
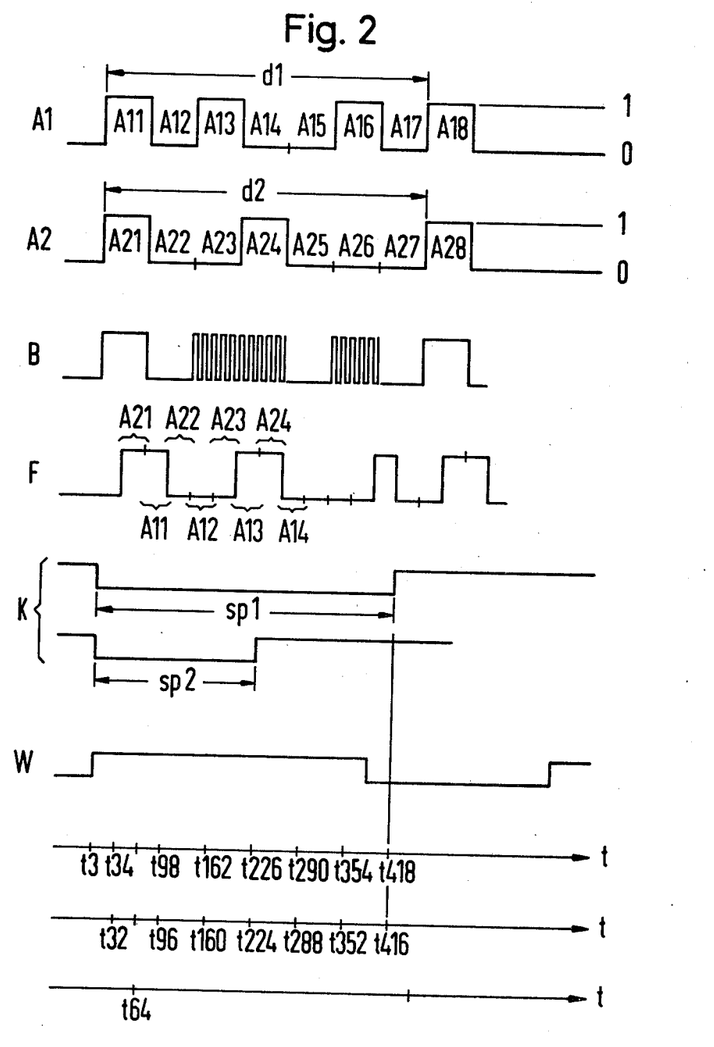
FIG. 2 is a time-waveform diagram illustrating signals which occur in the data transmission system illustrated in FIG. 1.

FIG. 2 illustrates the signals A1 and A2 emitted from the data sources DQ1 and DQ2. The abscissa indicates time $t$. The binary values of the individual bits are referenced 0 and 1. During the duration $d1$, the first character is signalled with the signal A1. The bit A11 forms the start element of the first character, the bits A12, A13, A14, A15, A16 form the information bits and the bit A17 forms the stop element of the first character. The first character is thus formed by the word 1010010. The bit A18 represents the start element of the next character.

During the duration $d2$, the signal A2 signals another character, where the bit A21 represents the start element, the bits A22, A23, A24, A25, A26 represent the information bits and the bit A27 represents the stop element. This additional character is thus formed by the word 1001000. The bit A28 represents the start element of the next character.

The signals A1, A2 and also all the other non-illustrated signals up to the signal An are generally not in phase, and the individual bits occur in different bit frames, and the individual characters in different character frames. In addition, the signals A1 to An are generally distorted. The signals A1 to A n thus possess different phase states in relation to the transmission system by which the t.d.m. signal F is transmitted across the transmission link FT. Therefore in the case of t.d.m. transmission it is necessary to bring the individual bits into phase. It would be conceivable to carry out this bringing into phase by employing channel units which are connected into the channels between the individual data sources DQ1 to DQn and the inputs of the multiplexer MS. Channel units of this type, which are known, carry out the bringing into phase prior to the multiplexer MS. In the present case, however, the bringing into phase is carried out in centralized fashion with the aid of in-phasing device PS.

The data sources DQ1 to DQn can, for example, be in the form of teleprinters, teleprinter exchanges, punched tape readers, punched card readers. To simplify the illustration, only three data sources have been shown, whereas in practice in a hundred or more such data sources may be provided. At the receiving end, the data sinks can, for example, be in the form of teleprinters, teleprinter exchanges, punched tape punches and punched card punches.

Figure 3:
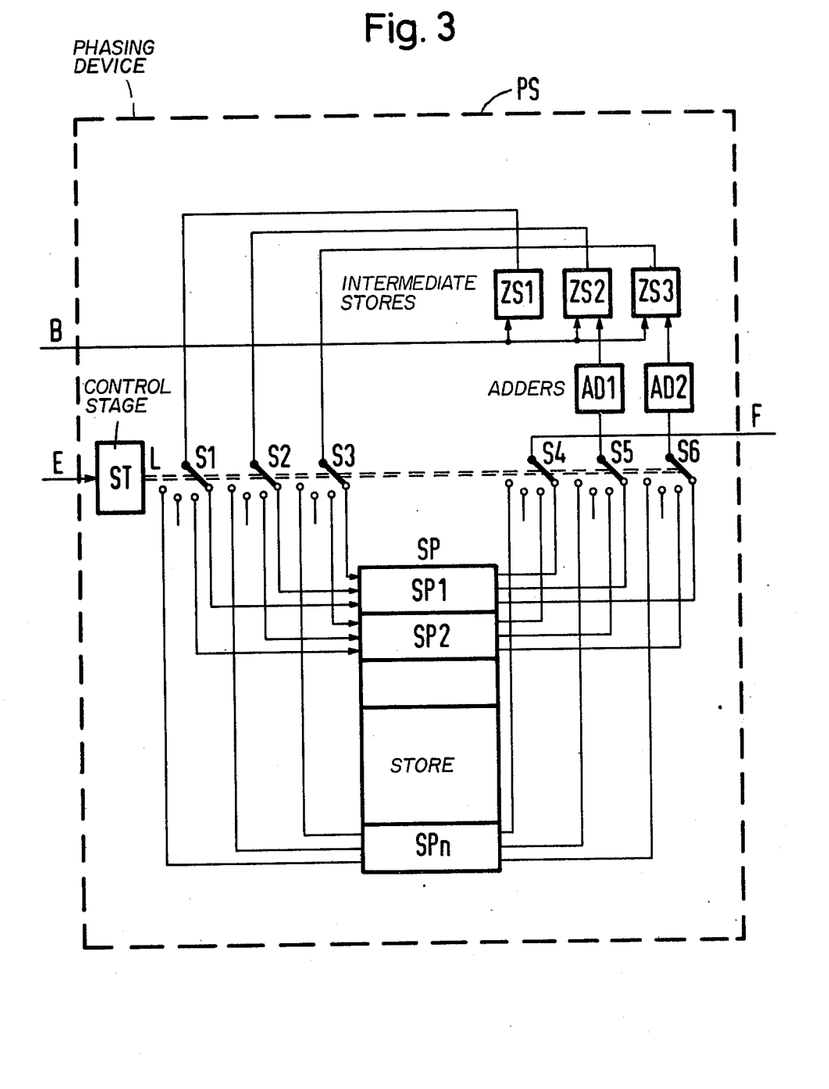
FIG. 3 is a block circuit diagram of an in-phasing device.

FIG. 3 schematically illustrates the in-phasing device PS. It includes a store SP which possesses a plurality of components SP1, SP2 ... SPn, which are each assigned to one of the data sources DQ1, DQ2 ... DQn, and are assigned to corresponding channels. Switches S1, S2, S3, S4, S5, S6 each possess, in addition to a central contact, a total of $n$ further contacts which are each connected to one of the components SP1 to SPn. The total of $n$ switch positions are set up by means of a control stage ST.

It has already been mentioned that the address counter AS represented in FIG. 1 continuously emits addresses which are assigned to the data sources, the channels and to the positions of the multiplexer MS. To simplify the drawing, only one address line has been shown. Generally, however, a plurality of address lines are provided via which binary numbers representing the individual addresses are emitted in parallel. If, for example, four address lines are provided, then in turn the addresses 0000, 0001, 0010, 0011, 0100, etc. are emitted, until the binary number corresponding to the number n has been reached. These addresses serve to set the multiplexer MS and to control the control stage ST illustrated in FIG. 3, in such manner that the switches S1 to S6 move up by one switch position with each new address. The central contacts of the switches S5 and S6 are connected to address AD1 and AD2. The signal B emitted from the multiplexer MS is conducted to intermediate stores ZS1, ZS2 and ZS3.

Figure 4:
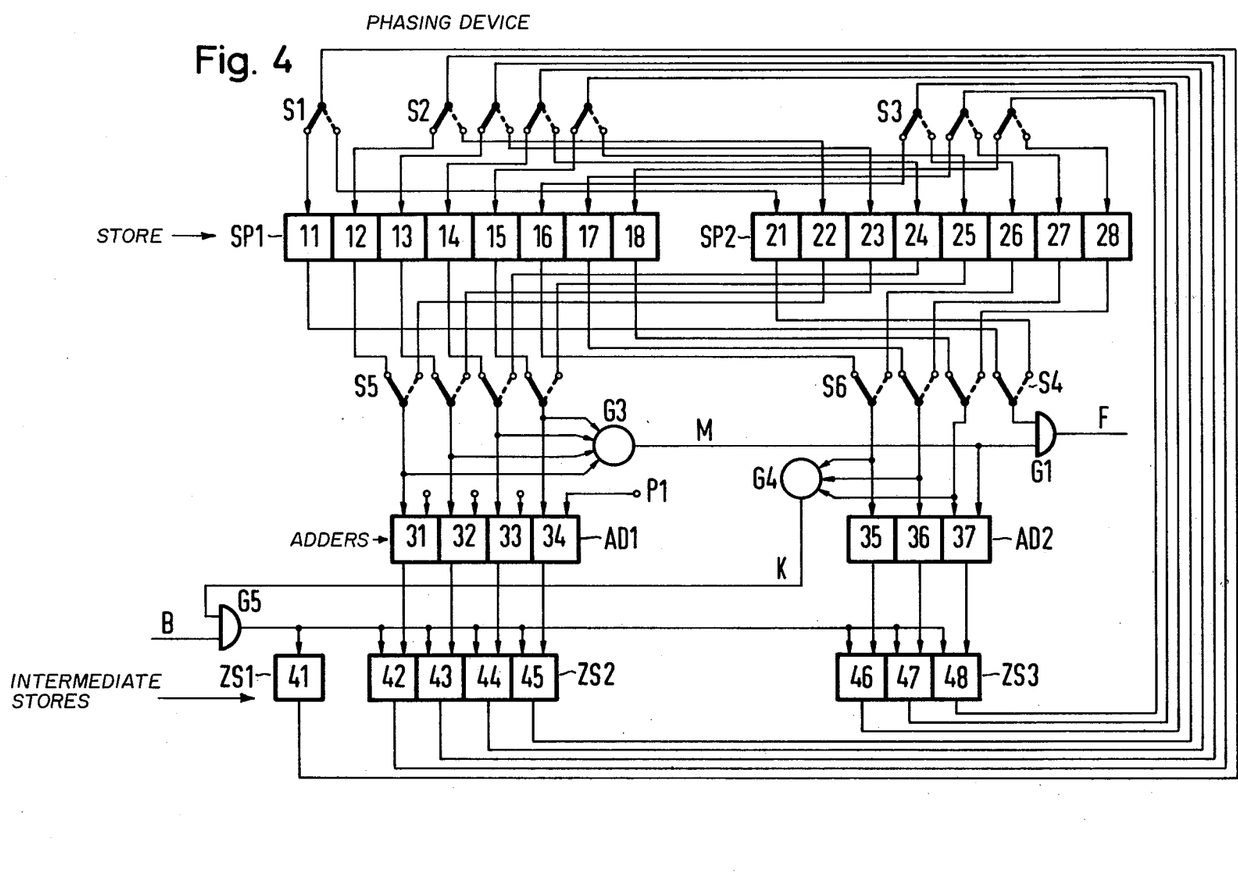
FIG. 4 is a schematic diagram which shows in detail the in-phasing device represented in FIG. 3.

FIG. 4 is a circuit diagram of an in-phasing device PS providing more detail than FIG. 3, but which relates only to the situation of $n=2$, in order to simplify the description of the mode of operation. The components SP1 and SP2 of the store SP comprise cells 11 to 18, and 21 to 28, each of which store one bit. Adder AD1 is a binary adder which is formed by four cells 31, 32, 33, 34. The adder AD1 enables the addition of two binary numbers, one of which is input via the central contacts of the switches S5, and is added to the second number 0001. This second number is input into the adder AD1 in that a 1 signal is permanently present at the input of the cell 34 which input is connected to the circuit point P1. The adder AD1 takes into account carries from one cell to another. If, for example, the number 0011 is supplied via the central contacts of the switch S5, the adder adds a 1 to the latter and emits the word 0100 via its outputs. The adder AD2 is likewise a binary adder and obtains a first addend via the central contacts of the switches S6. The second addend 001 is input via the cell 37 whenever the signal M assumes the binary value 1.

The intermediate stores ZS1 comprises only a cell 4, which is capable of assuming two stable states which are referred to as 0 state and 1 state. When during the 0 state, a 0 signal is supplied, the 0 state remains, whereas when a 1 signal is supplied the cell is transformed into its 1 state. When the cell assumes its 1 state, it is transformed by a 0 signal into its 0 state, whereas when a 1 signal is supplied it remains in its 1 state. The intermediate stores ZS2 and ZS3 comprise cells 42 to 45, and 46 to 48, each store one bit and are likewise capable of assuming a 0 state and a 1 state. The cells 42 to 48 each have two inputs, of which those inputs connected to the gate G5 are resetting inputs so that on the occurrence of a 1 signal at the output of the gate G5, all the cells 42 to 48 are reset to their 0 state. The second inputs of the cells 42 to 45 are connected to the outputs of the adder AD1, and the second inputs of the cells 46 to 48 are connected to the outputs of the cells of the adder AD2.

The switches S1 to S6 are all, preferably electronic switches. The switches S2 and S5, illustrated in FIG. 3, consist, as can be seen from FIG. 4, of a group of in each case four switches, and the switches S3 and S6 illustrated in FIG. 3 consist, as can be seen from FIG. 4, of a group of in each case three switches. The switches S1 to S6 illustrated in FIG. 4 are likewise controlled with the control stage ST shown in FIG. 3, each address being precisely assigned one switch position. As in the present case of FIG. 4, only two addresses have been assumed to exist, it is assumed that the solid line switch position corresponds to the address one, and the broken-line switch position corresponds to the address two.

Figure 5:
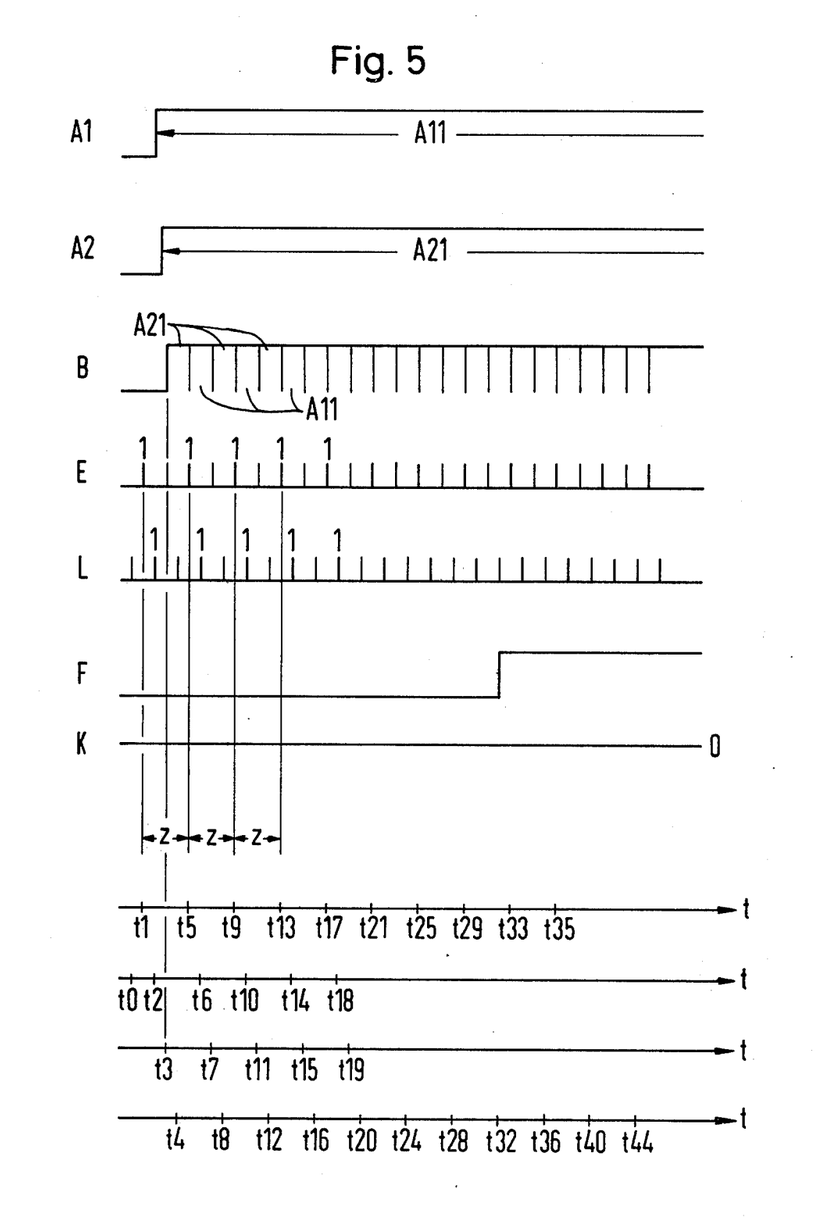
FIG. 5 is a time-waveform diagram illustrating signals which occur in the in-phasing device represented in FIGS. 3 and 4.

FIG. 5 shows signals and diagrams with the aid of which the mode of operation of the in-phasing device illustrated in FIGS. 3 and 4 will be explained. The abscissa relates again to the time $t$. In comparison to FIG. 2, the signals have been shown on a larger time scale. The diagram E represents the times at which the addresses of the address counter As are emitted. At the time $t1$ the address one is emitted so that the switch, shown in FIG. 1, of the multiplexer MS, assumes the solid line switch position, and the data source DQ1 is connected via the first channel to the output of the multiplexer, and the signal B=0 is emitted. At the time $t3$, the address two is emitted, so that the switch, shown in FIG. 1, of the multiplexer MS assumes the broken line switch position. With the signal A21=1, the signal B=1 is now emitted via the output of the multiplexer. At the time $t5$, the address one is again set, and in the solid line position of the mulitplexer switch, with the signal A11=1, the signal B=1 is formed. At the time $t7$, the address two is again set up so that the signal is formed successively of components of the bit A21 and of the bit A11. Thus, within the duration of a cycle Z, all the addresses are successively output, and the input of the multiplex MS are each connected once to the latter's output. The cycle duration Z is considerably shorter than the duration of the bits A11 and A21.

It has already been mentioned that the switches S1 to S6 illustrated in FIGS. 3 and 4 are set with the aid of the control stage ST in dependence upon the relevant address. The diagram L shows the times at which the individual switch positions are set up. If the diagrams E and L are compared, it will be seen that the switch positions are set up somewhat later than the emission of the corresponding addresses from the address counter AS. At the time t2, the solid line switch positions are set up which correspond to the address of one.

Even when the signal K assumes a 1 value at the time t2, a 0 signal is emitted via the output of the gate G5, as at the time t2, the signal B=0. Thus, the cell 41 is transformed into its 0 state, and the cells 42 to 48 are left in the states which they already occupy. Shortly thereafter, the items of information stored in the cells 41 to 48 are transferred via the switches S1, S2, S3 into the cells 11 to 18, but are initially not output.

At the time t4, the switch positions shown in broken lines are set up, corresponding to the address two. With the signals B=1 and K=1, a 1 signal is emitted via the output of the gate G5. Thus, the 1 state of the cell 41 is set up, and the cells 42 to 48 are transformed into their 0 states. Shortly thereafter, the items of information stored in the cells 41 to 48 are transferred via the switches S1 to S3 into the cells 21 to 28.

The cell 21 is now in the 1 state, and the cells 22 to 28 are in their 0 state. The items of information stored in the cells 21 to 28 are not initially output.

It is assumed that at the time t6 the signals B=1 and K=1 are still being output, so that at the time t6, via the output of the gate G5 a 1 signal is emitted. The latter 1 signal produces the 1 state in the cell 41, and the 0 states in the cells 42 to 48. Shortly thereafter, the items of information stored in the cells 41 to 48 are transferred via the switches S1 to S3 into the cells 11 to 18 where they temporarily remain. Thus, the cell 11 stores a 1 signal, and the cells 12 to 18 store 0 signals.

From the time t8 onwards, the signal K=0 is emitted so that a 0 signal is also emitted via the output of the gate G5. The cell 41 is thus brought into its 0 state. The states of the cells 42 to 48 are not altered by the 0 signal. Shortly after the time t8, the items of information stored in the cells 21 to 28 are conducted to the adders AD1 and AD2 via the switches S5 and S6, with the broken line switch positions. The adder AD1 adds the number 0001 to the number 0000 and emits this number 0001 to the cells 42 to 45 from which they are output into the cells 22 to 25. The adder AD2 receives the number 000 via the switches S6, and with the signal M=0 as second addend obtains the number 0000, so that this number is input into the cells 46 to 48 and from there into the cells 26 to 28.

Next, the processes which take place on the output of the addresses "two" will be described. At the time t12, the broken line positions of the switches are again set, and as first addend, the adder AD1 obtains the word 0001, and, via the circuit point P1, the word 0001, so that it emits the word 0010 to the cells 42 to 45, from which it is restored into the cells 22 to 25. This is also shown in Table 1. From the time t4 until the time t32, the addend supplied via the switches S5 to the adder AD1 increases constantly until finally, at the time t32, the word 0111 is conducted to the gate G3, and the signal M=1 is emitted. Via the gate G1 the information stored in cell 21 is emitted. The time t32 falls approximately in the middle of the bit A21 represented in FIG. 2. Thus the bit A21 is sampled in its center and at the time t32 produces a part of the t.d.m. signal F.

TABLE 1

| t | 31 | 32 | 33 | 34 | M | 35 | 36 | 37 | K |
|---|----|----|----|----|---|----|----|----|---|
| t0 | 1 | 1 | 1 | 1 |   | 1 | 1 | 1 | 1 |
| t4 | 0 | 0 | 0 | 0 | 0 | 0 | 0 | 0 | 0 |
| t8 | 0 | 0 | 0 | 1 | 0 | 0 | 0 | 0 | 0 |
| t12 | 0 | 0 | 1 | 0 | 0 | 0 | 0 | 0 | 0 |
| t16 | 0 | 0 | 1 | 1 | 0 | 0 | 0 | 0 | 0 |
| t20 | 0 | 1 | 0 | 0 | 0 | 0 | 0 | 0 | 0 |
| t24 | 0 | 1 | 0 | 1 | 0 | 0 | 0 | 0 | 0 |
| t28 | 0 | 1 | 1 | 0 | 0 | 0 | 0 | 0 | 0 |
| t32 | 1 | 1 | 1 | 1 | 1 | 0 | 0 | 1 | 0 |
| t96 | 1 | 1 | 1 | 1 | 1 | 0 | 1 | 0 | 0 |
| t160 | 1 | 1 | 1 | 1 | 1 | 0 | 1 | 1 | 0 |
| t224 | 1 | 1 | 1 | 1 | 1 | 1 | 0 | 0 | 0 |
| t288 | 1 | 1 | 1 | 1 | 1 | 1 | 0 | 1 | 0 |
| t352 | 1 | 1 | 1 | 1 | 1 | 1 | 1 | 0 | 0 |
| t416 | 1 | 1 | 1 | 1 | 1 | 1 | 1 | 1 | 1 |

After the time t32, the adder AD1 starts to count upwards again, and at the time t64 (FIG. 2) at the end of the bit A21, obtains the word 1111. Then the adder AD1 is reset to the starting position and obtains the word 0000, which it obtained at the time t4. In counting further upwards, the adder AD1 again obtains the word 0111 at the time t96, and the signal M=1 is thereby produced again. The time t96 (FIG. 2) lies approximately in the middle of the second bit A22. Thus, the bit A22 is sampled at the time t96 and after the time t96 a further part of the signal F is fed-in via the gate G1. As shown in Table 1, at the times t32, t96, t160, t224, t288, t352, and t416 the signals M=1 are output a total of seven times and thus, the bits A21, A22, A23, A24, A25, A26, A27 shown in FIG. 2 are consecutively sampled in their centers and corresponding components of the signal F are produced.

In the foregoing the situation relating to the output of the addresses "two" has been described. When the addresses "one" are output, and the solid line switching positions of the switches S5 and S6 are set, the adder AD1 is caused to count upwards, as can be seen from Table 2. At the times t34, t98, t162, t226, t290, t354, t418, the word 0111 is present at the inputs of the adder AD1, so that the signal M=1 is produced. Thus, the bits A11, A12, A13, A14, A15, A16, A17 which are shown in FIG. 2 are consecutively sampled in their middles, and each time, a sub-signal of the signal F is supplied and emitted via the gate G1.

In the present situation it has been assumed that the bits A11 and A21 occur almost simultaneously, so that the bit A21 is sampled at the time t32 and the bit A11 shortly thereafter at the time t34. Under this condition, the adder AD1 is offered the same addends 0000 and 0001 consecutively at the times t4, t6 and t8, t10, respectively. Generally, the bits A11 and A21 in no case occur simultaneously, and in the adder AD1 on the occurrence of the particular set addresses, successively addends are presented which differ considerably from one another. Therefore, with each particular address the adder AD1 will count upwards in a different fashion and completely independently.

TABLE 2

| t | 31 | 32 | 33 | 34 | M | 35 | 36 | 37 | K |
|---|----|----|----|----|---|----|----|----|---|
| t2 | 1 | 1 | 1 | 1 |   | 1 | 1 | 1 | 1 |
| t6 | 0 | 0 | 0 | 0 | 0 | 0 | 0 | 0 | 0 |
| t10 | 0 | 0 | 0 | 1 | 0 | 0 | 0 | 0 | 0 |
| t14 | 0 | 0 | 1 | 0 | 0 | 0 | 0 | 0 | 0 |
| t18 | 0 | 0 | 1 | 1 | 0 | 0 | 0 | 0 | 0 |
| t22 | 0 | 1 | 0 | 0 | 0 | 0 | 0 | 0 | 0 |
| t26 | 0 | 1 | 0 | 1 | 0 | 0 | 0 | 0 | 0 |

TABLE 2-continued

| t | 31 | 32 | 33 | 34 | M | 35 | 36 | 37 | K |
|---|----|----|----|----|---|----|----|----|---|
| t30 | 0 | 1 | 1 | 0 | 0 | 0 | 0 | 0 | 0 |
| t34 | 1 | 1 | 1 | 1 | 1 | 0 | 0 | 1 | 0 |
| t98 | 1 | 1 | 1 | 1 | 1 | 0 | 1 | 0 | 0 |
| t162 | 1 | 1 | 1 | 1 | 1 | 0 | 1 | 1 | 0 |
| t226 | 1 | 1 | 1 | 1 | 1 | 1 | 0 | 0 | 0 |
| t290 | 1 | 1 | 1 | 1 | 1 | 1 | 0 | 1 | 0 |
| t354 | 1 | 1 | 1 | 1 | 1 | 1 | 1 | 0 | 0 |
| t418 | 1 | 1 | 1 | 1 | 1 | 1 | 1 | 1 | 1 |

With the signals M=1 the adder AD2 is caused to count upwards, as shown in Tables 1 and 2. In accordance with Table 1, at the time t416 the adder AD2 is supplied with the word 111, and, using the gate G4, at this time the signal K=1 is emitted. At the time t416, this signal K=1 relates to the address "two" and prepares the gate G5 for opening. Subsequently, with the signal B=1, a 1 signal is again emitted from the output of the gate G5, which resets the cells 42 to 48 into their 0 states, and prepares the sampling of a new character. In accordance with Table 2, at the time t418 a signal M=1 is emitted, and thus, in a similar fashion as at the time t416, the gate G5 is opened and the cells 42 to 48 are reset into their 0 states. In this way preparation is made for the sampling of a new character with the bit A18. The signal F is composed of sub-signals which, in this exemplary embodiment, correspond, in turn, to the bits A21, A11, A22, A12, A23, A13, A24, A14 and so on.

The bits A17 and A27 shown in FIG. 2 (stop elements) have the same duration as the other bits of the signals A1 and A2. In many cases, the data sources DQ1 to DQn shown in FIG. 1 emit signals whose stop elements are 1½ times longer than the remainder of the bits. The circuit arrangement which has been described with reference to FIGS. 1 to 5 operates satisfactorily regardless of the length of the stop elements. In particular it is possible for all, or only individual, of the signals emitted from data sources to contain stop elements which are 1½ times longer than the other bits.

Figure 6:
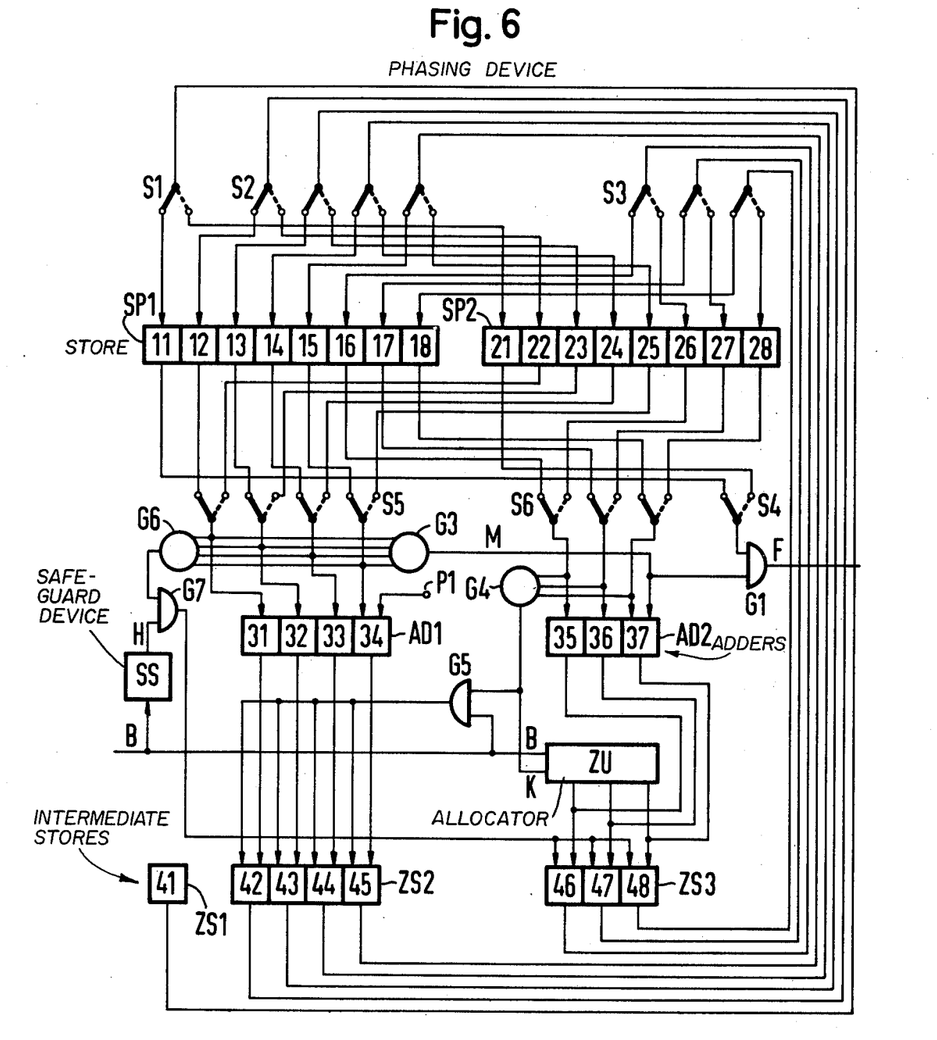
FIG. 6 is a schematic diagram which illustrates an alternate preferred exemplary embodiment of an in-phasing device with a start safeguard device.

FIG. 6 shows a block circuit diagram of an in-phasing device PS which contains not only those components which have already been described with reference to FIG. 4, but also the start element safeguard device SS, the gates G6, G7 and an allocator ZU. The allocator ZU operates in accordance with Table 3, which shows that with the signals B=1 and K=1 the word 000 is written into the cells 46, 47, 48, similarly, as already described with reference to FIG. 4. However, with the signals B=0 and K=1, the word 100 is written into the cells 46, 47, 48 and thus the count of the counter, consisting of adder AD2 and intermediate store ZS3, is suddenly increased, which will be discussed in detail in the following. When a 1 signal is emitted via the output of the gate G7 to the inputs of the cells 46, 47, 48, the word 111 is written into these cells.

TABLE 3

| B | K | | | |
|---|---|---|---|---|
| 0 | 0 | | | |
| 0 | 1 | 1 | 0 | 0 |
| 1 | 0 | | | |
| 1 | 1 | 0 | 0 | 0 |

Figure 7:
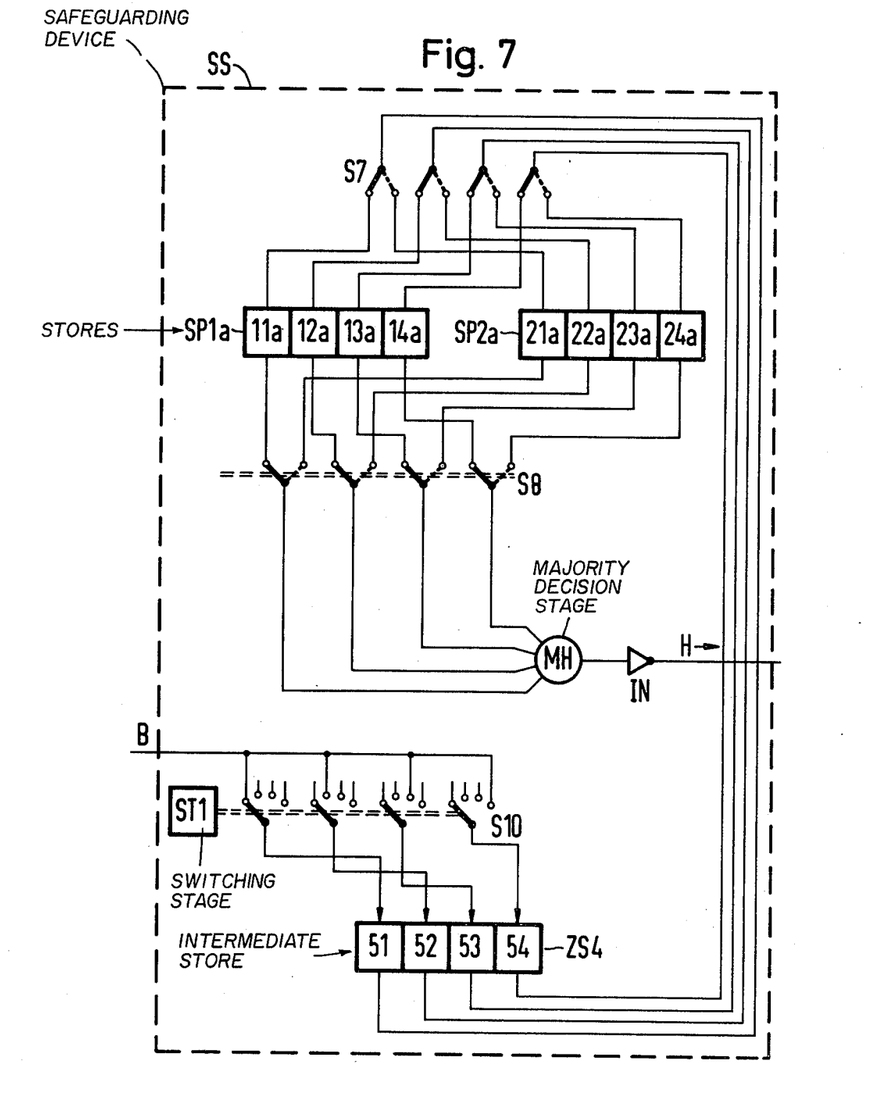
FIG. 7 is a schematic diagram showing in detail the start safeguard device schematically illustrated in FIG. 6.

FIG. 7 is a more detailed view of the start element safeguarding device SS schematically illustrated in FIG. 6. The switches S7 and S8 operate similarly to the switches represented in FIG. 4, and with each address assume a different switching position. In the present case the solid line switch position is set up in the case of the address "one," and the broken line switching position is set up in the case of the address "zero." Thus, the switches S7 and S8 can be controlled with the switching stage ST illustrated in FIG. 3. The switches S10 each possess four switching positions which are set up with the aid of the control stage ST1 in such manner that each of the switch positions remains set up for the duration of one cycle and thus during the call-up of all the addresses. it is assumed that the switches S10 occupy the solid line first switching position at the time t3, at which the address "two" is set up. Thus, the the bit A21=1 is stored in the cell 51 and is transferred via one of the switches S7 into the cell 21a. At the time t5, the first switching position of the switches S10 is still set, so that the bit A11=1 is input into the cell 51 from where, via the first of the switches S7, in the solid line switch position, it is transferred into the cell 11a. Thus, a first cycle has been concluded, and during the second cycle which now follows, the switches S10 each assume a second switch position with which at the time t7, the bit A21=1 is input via the cell 52 into the cell 22a and at the time t9 the bit A11=1 is input via the cell 52 into the cell 12a. During a third cycle, the switches S10 each assume a third switch position so that at the time t11 the bit A21=1 is input via the cell 53 into the cell 23a, and at the time t13 the bit A11 is input via the cell 53 into the cell 13a. During the fourth cycle, which now follows, at the time t15, the bit A21 is input via the cell 54 into the cell 24a, and at the time t17 the bit A11 is input via the cell 54 into the cell 14a. The cells 11a, 12a, 13a, 14a now store the bits A11, and the cells 21a, 22a, 23a, 24a now store the bits A21.

TABLE 4

| | | | | | | | | | | | | | | | | |
|---|---|---|---|---|---|---|---|---|---|---|---|---|---|---|---|---|
| | 0 | 1 | 0 | 1 | 0 | 1 | 0 | 1 | 0 | 1 | 0 | 1 | 0 | 1 | 0 | 1 |
| | 0 | 0 | 1 | 1 | 0 | 0 | 1 | 1 | 0 | 0 | 1 | 1 | 0 | 0 | 1 | 1 |
| | 0 | 0 | 0 | 0 | 1 | 1 | 1 | 1 | 0 | 0 | 0 | 0 | 1 | 1 | 1 | 1 |
| | 0 | 0 | 0 | 0 | 0 | 0 | 0 | 0 | 1 | 1 | 1 | 1 | 1 | 1 | 1 | 1 |
| MH | 0 | 0 | 0 | 0 | 0 | 0 | 0 | 1 | 0 | 0 | 0 | 1 | 0 | 1 | 1 | 1 |
| H | 1 | 1 | 1 | 1 | 1 | 1 | 1 | 0 | 1 | 1 | 1 | 0 | 1 | 0 | 0 | 0 |

With each address, the switches S8 serve to connect one of the stores SP1a to the majority decision stage MH, whose mode of functioning can be seen from Table 4. In accordance with Table 4, the majority decision stage MH emits a 1 signal only when at least three 1 signals are present at its inputs, whereas otherwise 0 signals are emitted. This mode of operation is based on the assumption that the bits A11 and A21 illustrated in FIG. 5 may be temporarily disturbed, so that the stores SP1a and SP2a may not always, as described, store the words 1111 and 1111, respectively, but possibly also the words 0011 and 1011, respectively. Thus, the majority decision stage MH serves to determine whether the majority of the cells 11a to 14a to and 21a to 24a store 1 signals, and if so, it can be assumed that a start element A11, A21 definitely exists. The greater the number of the storage cells 11a to 14a, 21a to 24a, 51 to 54, and the greater the number of the corresponding switches S7, S8, S10, the greater is the certainty with which the output signal of the majority decision stage MH and the signal H=0 signals the existence of a start element A1 or A2.

After the fourth switching positions of the switches S10, with the switching stage ST1, the first, second, third . . . switching positions are set up consecutively, and the signal H is continuously produced. With the aid of the gate G6 illustrated in FIG. 6, a 1 signal is emitted whenever the word 0110 is present at its inputs as is the case for example at the times t28 in accordance with Table 1, and t30 in accordance with Table 2. Thus, with the aid of this gate G6 a time is established, and if at this time, with H=1, the absence of a start element is signalled, then via the output of the gate G7 a 1 signal is emitted with which the word 111 is input into the cells 46, 47, 48. Thus, the counting processes represented in Tables 1 and 2 are terminated prematurely, i.e., before the times t416 and t418 are reached, so that the in-phasing of a start element can be started without delay. If, however, at the time appointed by the gate G6, the signal H=0 is emitted, then via the output of the gate G7 a 0 signal is likewise emitted, but this has no effect on the cells 46, 47, 48 so that the counting process represented in Tables 1 and 2 is not disturbed. In this case the start elements A11 and A21 are signalled and the sampling of the corresponding characters, as described, is initiated.

With the aid of FIGS. 4 and 6 it has been described that the counting processes using the adders AD1, AD2 and the intermediate stores ZS2, ZS3 can only be started with the signal K=1. As shown in FIG. 2, before the time t3, the signal K=1 enables the bits A11 and A21 to be sampled, and after the time t416, enables the bits A18 and A28 to be sampled. The time from the time t3 until the time t418 can be designated as blocking time sp1 because during this time the described counting processes take place without the possibility of their being disturbed by leading edges of other bits, for example the bits A13 and A24.

If, instead of the signals A1, A2, dialling pulses W are to be transmitted, then, on account of the relatively long blocking time sp1, difficulties can occur. In order to avoid such difficulties, the circuit arrangement respresented in FIG. 6 signals the presence of such dialling pulses W and the blocking time is shortened in order to ensure a reliable transmission of the signal W. In particular the signal K is produced with the blocking time sp2. As shown in Table 3, with the signals B=0 and K=1 the word 100 is input into the cells 46, 47, 48, which results in a substantial increase in the count, and the count 111 is reached as early as the time t224 and t226. If, thus with B=0 and K=1, a dialling pulse W is signalled, then as early as the time t32, the cells 35, 36, 37 store the word 100 so that at the time t96 the word 101, at the time t160 the word 110 and at the time t224 the word 111 is contained in the cells 35, 36, 37 and the signal K=1 is read out which signals the termination of the blocking time sp2. Similarly, in the case of the address "two," as early as the time t34 the word 100, at the time t98 the word 101, at the time t162 the word 110 and at the time t226 the word 111 is stored in the cells 35, 36, 37, so that at the time t226, with the signal K=1 the end of the blocking time sp2 is signalled.

Data transmission systems as modified in accordance with the apparatus described in FIGS. 3, 4 and 6 are characterized by low expense, because, apart from the n word stores SP1, SP2 . . . SPn for the n data sources DQ1, DQ2 . . . DQn only one of all the other components are required, regardless of how many data sources n are provided.

The embodiments constructed according to the principles of the invention and described hereinabove are intended only to be exemplary. It is contemplated that the described embodiments can be modified or changed in a number of ways known to those skilled in the art while remaining within the scope of the invention as defined by the appended claims.

We claim:

1. In a system for the time division multiplex (t.d.m.) transmission of binary signals emitted from a plurality of data sources, each of which is connected to a respective input of a multiplexer which during a cycle of operation establishes a conductive connection between each said input and an output for transmission to a receiver over a transmission link, the improvement comprising:
    address generator means for, during each said cycle, successively emitting as many address signals as there are data sources, each said address signal being coupled to said multiplexer for establishing the said conductive connections, respectively, between said inputs and said output, and
    in-phasing means connecting said output of said multiplexer to said transmission link, said in-phasing means comprising:
    a number of one word binary stores corresponding to the number of said data sources,
    first, second and third intermediate stores, a start element of a binary word being stored in said first intermediate store responsive to a release signal, said second and third intermediate stores being set to their zero states,
    first, second and third switches for, respectively, coupling the contents of said first, second and third intermediate stores into the one of said word stores corresponding to the currently emitted address signal,
    fourth, fifth and sixth switches, each having contacts connected to each of said word stores, a center contact of said fourth switch being connected to the output of said in-phasing means,
    first adder means connecting a center contact of said fifth switch to an input of said second intermediate store and
    second adder means connecting a center contact of said sixth switch to an input of said third intermediate store.

2. The improved apparatus in claim 1 further comprising:
    means for emitting a premature release signal to said third intermediate store responsive to a dialling pulse.

3. The improved apparatus defined in claim 1 further comprising:
    means for sampling a predetermined number of times the individual start elements of the transmitted binary signals,
    additional storage means for receiving the values from the sampled start elements,
    majority logic means for producing a logic signal indicating the majority of the binary values of the sampled start elements and
    means for blocking the operation of said in-phasing means responsive to a logic signal value indicating the presence of incorrect start elements.

* * * * *